D. C. ANDERSON.
MEANS FOR CHARGING STORAGE BATTERIES.
APPLICATION FILED MAR. 21, 1914.

1,186,158.

Patented June 6, 1916.

WITNESSES

INVENTOR
David C. Anderson
by Christy and Christy
his attorneys

UNITED STATES PATENT OFFICE.

DAVID C. ANDERSON, OF SEWICKLEY, PENNSYLVANIA.

MEANS FOR CHARGING STORAGE BATTERIES.

1,186,158.  Specification of Letters Patent.  Patented June 6, 1916.

Application filed March 21, 1914. Serial No. 826,414.

*To all whom it may concern:*

Be it known that I, DAVID C. ANDERSON, residing at Sewickley, in the county of Allegheny and State of Pennsylvania, a citizen of the United States, have invented or discovered certain new and useful Improvements in Means for Charging Storage Batteries, of which improvements the following is a specification.

My invention relates to the charging of electric storage batteries, and has particularly to do with such batteries as are used on automobiles for lighting, starting and sparking, and which are charged *in situ* by a dynamo operatively connected to the variable speed engine or prime mover of the automobiles.

The object of my invention is to provide means for regulating the intensity of a variable charging current, such as is necessarily generated by a variable speed dynamo, to the end that such storage batteries may be fully charged under all working conditions without sustaining any injury.

It is characteristic of storage batteries that any injury which they may sustain when being charged is caused by overheating the plates. Such overheating may, when the charging current is of too great intensity, occur before the battery has been fully charged; or it may occur after the battery has received its capacity charge, it being understood that under such conditions a further charging will cause a generation of gas and heat.

Various expedients have been employed for controlling or regulating battery charging currents, but, as far as I am aware, they have all, because of a failure to regulate the intensity of the charging current in proportion to the ability of the battery to receive the current without injury, proven to be inadequate to accomplish the object of my invention.

In the practice of my invention I vary the intensity or charging strength of the charging current according to the temperature of the battery and inversely with relation thereto. Means are provided to effect a gradual or step-by-step diminution of the current as the temperature of the cells rises, such means automatically acting in the opposite manner when the cell temperature drops.

In the accompanying sheet of drawings, forming part of my specification, I have illustrated three embodiments of my invention.

Figure 1:
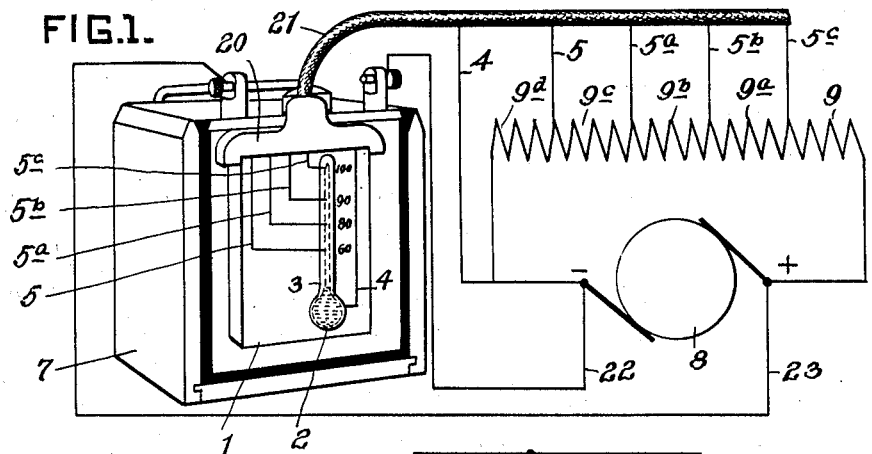
Figure 2:
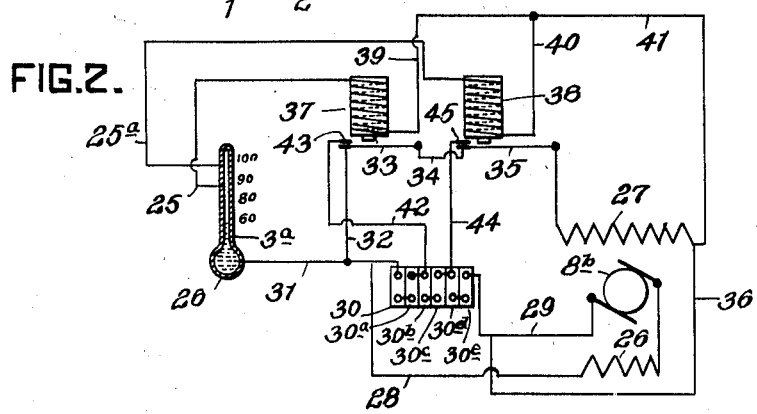

Figure 1 is a perspective transverse sectional view of a battery cell, showing one form of current controlling instrument extending between the battery plates, and showing, diagrammatically, the electrical connections; Fig. 2 a sectional view through a controlling instrument similar to that shown in Fig. 1, but applied in a different manner for controlling the charging circuit, which, as in Fig. 1, is shown diagrammatically; and Fig. 3 a sectional view through a controlling mechanism differing from that of Figs. 1 and 2, the electrical connections also being shown diagrammatically.

In the several figures like numerals are used to designate like parts.

In the embodiment of my invention shown in Fig. 1 the charging circuit is controlled by an expansible electrical-conducting liquid placed in a suitable container, and adapted, as it expands or contracts according to the temperature of the battery, to close or open successively a plurality of electrical circuits. The fluid container is preferably in the form of a thermometer formed in a relatively thick body of glass 1, and comprising a closed bulb 2 and a closed tube 3 leading from the bulb. The conducting liquid, which is preferably mercury, is placed in the bulb 2. An electrical conductor 4 is molded in the glass body 1 and extends into the container or bulb 2 in such position as to be in contact with the mercury at all working temperatures. In a similar manner a plurality of electrical conductors 5, 5ᵃ, 5ᵇ and 5ᶜ are molded in the glass and extend at suitable longitudinal intervals into the tube 3, so that, as the mercury expands through the tube, it will contact successively with each of such conductors. The top of the glass body 1 is secured to an insulation holder 20 within which the several conductors are clustered together and extended through a conduit 21. This circuit controller is suitably placed in a battery cell 7, as shown in Fig. 1, and may be used in any desired manner to effect a step-by-step regulation of the charging current. As shown in Fig. 1, the conductors 5, 5ᵃ, 5ᵇ and 5ᶜ are connected at suitable intervals in the dynamo field winding to the end that, as the temperature of the battery rises certain portions of the field will be shunted out of circuit with the consequent corresponding diminution of the intensity of the field. The battery 7 is placed in circuit with the dynamo armature 8 by means of conductors 22 and 23, and the field may be a shunt composed of a plurality of segments 9, 9a, 9b, 9c, and 9d, formed by the connections of the conductors 5, 5a, 5b, and 5c to the field. As will be seen, the conductor 4 is connected to the main or armature circuit.

For illustrative purposes the several conductors extending into the tube 3 are so disposed that the mercury will contact with them successively when the temperature of the battery is at or above 60, 80, 90 and 100 degrees F. More specifically, when the battery temperature is at or above 60 degrees F. the body of mercury will complete electrical continuity between the conductors 4 and 5, and, when it is at or above 80 degrees F., continuity will be established between the conductors 4 and 5a, etc. By such an arrangement, when the battery temperature is below 60 degrees, the entire dynamo field will be excited, and hence the maximum current generated by the dynamo at any variable speed of its armature will be effective to charge the battery. When the battery temperature rises to between 60 and 80 degrees, the field current, following the line of least resistance, will be shunted out of the field segment 9d and will flow through the conductor 5, body of mercury and conductor 4 to the main circuit. In like manner it will be readily seen that the several successive segments 9c, 9b and 9a of the field may be shunted out as the battery temperature rises above 80, 90 and 100 degrees, respectively, the strength of the charging current being in each instance correspondingly reduced. Furthermore, when the battery cools down, the field segments are again brought into service and without any attention or adjustment on the part of an operator. While I have stated that the several segments are shunted out successively, it will be understood that only a portion of the current is in each instance shunted out, such portions depending, of course, on the relative carrying capacities of the wires 5, 5a, etc., and the field winding. Preferably the conductors 5, 5a etc., have greater current carrying capacities than the field winding, but not so much greater that when a segment of the field is shunted out the current through the other portion of the field will be increased. Since as is well understood by those skilled in the art, a very light charging current will have no prejudicial heating effect upon a battery even when at a relatively high temperature, but on the other hand is desirable, the shunted field segments remain slightly active at the highest temperature, as well as a small segment 9 thereof.

In the embodiment of my invention illustrated in Fig. 2 substantially the same controlling instrument is shown for regulating the charging circuit, but in a different manner from that just explained. In order to simplify the drawing and the explanation thereof, but two conductors 25 and 25a are shown leading from the mercury tube 3a. It will, however, be readily understood that any number of such conductors may be used. The dynamo in this instance has a series field 26 and a shunt field 27, and the electrical connections are so arranged that, as the temperature of the battery rises, the voltage of the shunt field is diminished by successively cutting out of the shunt field circuit a desired number of the battery-cells. The main charging circuit includes conductors 28 and 29 connected to the battery composed of cells 30, 30a, 30b, 30c, 30d and 30e. A conductor 31 extends from the main circuit conductor 28 to the mercury chamber 2c, and the circuit through the shunt field 27 comprises a conductor 32 leading from the conductor 31, pivoted arm 33, conductor 34, pivoted arm 35, shunt field 27, and conductor 36 to the main circuit conductor 28. When the parts are in the position indicated in the drawing, the temperature of the battery being below 90 degrees, the battery will be charged with a full capacity current, the shunt field being excited by a current taken directly from the main circuit. In order to diminish the charging circuit when the temperature of the battery rises, I provide electro-magnets 37 and 38 above the pivoted arms 33 and 35, respectively, and I extend the conductor 25 to the winding of the magnet 37 and the conductor 25a to that of the magnet 38, as shown. The circuit is completed through these magnets by means of conductors 39 and 40, which unite to form the conductor 41 extending to the conductor 36. From the cell 30b a conductor 42 extends to a contact member 43 immediately above the pivoted arm 33, and in a similar manner a conductor 44 extends from the cell 30d to a contact member 45 above the arm 35. When the temperature of the battery rises to or above 90 degrees the circuit will be closed through conductor 31, mercury column, conductor 25, magnet 37 and conductors 39, 41 and 36, thus exciting the magnet 37 and lifting the arm 33 so that the shunt circuit will, instead of being taken from the main line, be taken from batteries 30b, 30c, 30d and 30e, it being observed that the circuit is, under this condition, broken through the conductor 32 and closed through the conductor 42. In a similar manner, when the temperature of the battery rises to 100 degrees the magnet 38 will raise the arm 35 and thus the shunt will be excited only by the cells 30$^d$ and 30$^e$. By this arrangement it will be seen that the shunt exciting current may be cut down in any desired number of steps.

Figure 3:
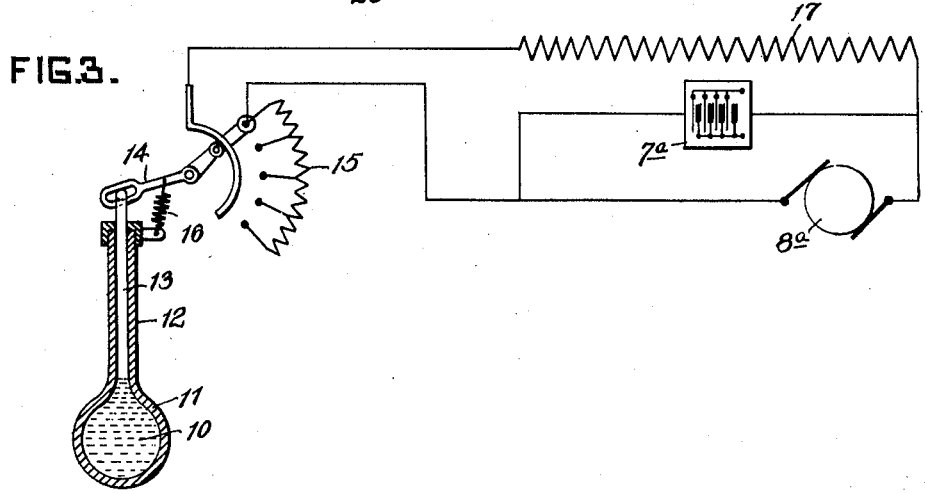

In the third embodiment of my invention, an expansible medium is employed to operate a rheostat in circuit with a shunt field, thus affording a regulation of the charging current with relation to the temperature of the battery. As shown in Fig. 3, the expansible medium may be a body of mercury 10 placed in a suitable container 11 having an open ended tube 12 extending therefrom. A rod 13 is mounted for longitudinal movement through the tube under the expansive force of the mercury, such rod having pivotal connection to a pivoted controlling arm 14 of a rheostat 15, there being a suitable spring 16 provided to insure a return movement of the arm 14 when the mercury contracts. In this embodiment of my invention the dynamo armature 8$^a$ is in a main circuit with the battery 7$^a$, the field 17 being shunted across the main circuit and through the rheostat.

The operation of the rheostat is readily apparent. As the temperature of the battery rises, the rod 13 will, by the expansion of the body of mercury 10, be moved through the tube 12 and cause the rheostat arm 14 to throw resistance into the field 17. And, when the battery temperature diminishes the rheostat arm will, under the action of the tension spring 16, move so as to cut out, step by step, portions of the field resistance.

By the practice of my invention storage batteries may, without sustaining any injury, be charged to their full capacity by means of a dynamo, which, on account of the variable speed of its armature, may generate a charging current of widely varying strength. Furthermore, the charging current may be automatically increased as well as decreased in proportion to the ability of the battery to receive further charge without injury. When my invention is applied to automobiles, to which it is particularly adapted, the charging current will be so regulated as to be of greater intensity in cold than in hot weather, a feature which is very desirable because batteries are less efficient, that is yield less current for a given charge, when cold than when warm.

I claim as my invention:

1. The combination of a dynamo, a storage battery in circuit therewith, and means controlled by the variations of the internal heat of the battery for effecting a step-by-step variation in the charging strength of the battery-charging current.

2. The combination of a dynamo, a storage battery in circuit therewith; and means controlled by the variations of the internal heat of the battery for effecting, in inverse relation with respect to such battery temperature variations, a step-by-step variation in the charging strength of the battery-charging current.

3. The combination of a dynamo, a storage battery in circuit therewith and adapted to be charged thereby, a heat expansible medium within said battery and subject to the variations in temperature thereof, and means controlled by the volumetric variations of said medium for effecting a step-by-step variation in the charging strength of the battery charging current.

4. The combination of a dynamo, a storage battery in circuit therewith and adapted to be charged thereby, a heat expansible medium within said battery and subject to the variations in temperature thereof, and means controlled by the expansion of said medium for decreasing and increasing step-by-step the charging strength of the battery-charging circuit.

5. The combination of a main electric circuit including a dynamo armature and a storage battery, a shunt field winding; a current regulator within said battery and comprising a closed fluid container having a closed tubular extension, a body of heat-expansible electrical-conducting liquid within the container, an electrical conductor in continual contact with said liquid and connected to said main circuit, and a plurality of conductors extending at longitudinal intervals from within the tubular extension of the container connected to said field winding at intervals thereof.

In testimony whereof I have hereunto set my hand.

DAVID C. ANDERSON.

Witnesses:
 FRED. KNOEDLER,
 I. B. PATTERSON.